United States Patent [19]
Lutgen et al.

[11] Patent Number: 6,160,639
[45] Date of Patent: Dec. 12, 2000

[54] METHOD AND SYSTEM FOR NEGOTIATING TRANSMITTING AND RECEIVING MODES FOR TRANSMITTING FACSIMILE DATA VIA A MEDIUM HAVING A VARIABLE DATA TRANSMISSION TIME

[75] Inventors: Craig Lawrence Lutgen; Robert James Harris, both of Fort Worth, Tex.

[73] Assignee: Motorola, Inc., Schaumburg, Ill.

[21] Appl. No.: 09/159,017

[22] Filed: Sep. 23, 1998

[51] Int. Cl.⁷ ...................................................... H04N 1/32
[52] U.S. Cl. ............................................ 358/442; 358/412
[58] Field of Search ..................... 358/426, 442, 358/431, 430, 434, 435, 436, 438, 439, 412; 455/422, 24; 379/100.01, 100.17

[56] References Cited

U.S. PATENT DOCUMENTS

| | | | |
|---|---|---|---|
| 5,463,477 | 10/1995 | Kakizaki ................................. | 358/431 |
| 5,517,323 | 5/1996 | Propach et al. ......................... | 358/409 |
| 5,566,000 | 10/1996 | Propach et al. ......................... | 358/412 |
| 5,621,894 | 4/1997 | Menezes et al. .................... | 395/200.12 |
| 5,896,371 | 3/1999 | Kobayashi et al. ..................... | 370/232 |
| 5,923,650 | 7/1999 | Chen et al. ............................. | 370/331 |
| 5,995,239 | 11/1999 | Kagawa et al. ......................... | 358/405 |

*Primary Examiner*—Cheukfan Lee
*Attorney, Agent, or Firm*—L. Bruce Terry

[57] ABSTRACT

A communications link having a plurality of communication media is coupled between an originating facsimile machine and a terminating facsimile machine. The plurality of communication media includes a medium having a variable data transmission time followed serially by a media having a constant data transmission time. In the communication link, a transmission mode acceptance message is intercepted from an acceptance-transmitting one of the terminating and originating facsimile machines. The transmission mode acceptance message is modified to form a modified transmission mode acceptance message for increasing a maximum received data rate in the terminating facsimile machine relative to a transmit data rate in the originating facsimile machine. Thereafter, the modified transmission mode acceptance messages sent to an acceptance-receiving one of the terminating and originating facsimile machines, wherein the modified transmission mode acceptance message is part of a sequence of messages for negotiating transmitting and receiving modes in the originating and terminating facsimile machines, respectively, which sequence permits a maximum data rate in the medium having a constant data transmission time to exceed a maximum data rate in the medium having a variable data transmission time, thereby mitigating the effects of the variable time of transmission.

17 Claims, 6 Drawing Sheets

METHOD AND SYSTEM FOR NEGOTIATING TRANSMITTING AND RECEIVING MODES FOR TRANSMITTING FACSIMILE DATA VIA A MEDIUM HAVING A VARIABLE DATA TRANSMISSION TIME

FIELD OF THE INVENTION

The present invention relates generally to facsimile telecommunications systems, and more particularly to the negotiation of transmitting and receiving modes for transmitting facsimile data by a medium having a variable data transmission time.

BACKGROUND OF THE INVENTION

Before a facsimile image is transmitted from an originating facsimile machine to a terminating facsimile machine, the originating and terminating facsimile machines send messages between the machines to negotiate transmitting and receiving modes for transmitting facsimile data. Such transmitting and receiving modes specify a set of parameters that are agreed upon prior to transmitting facsimile data. These parameters may include a data bit rate, a page size, the number of pixels per line, the number of lines per page, and whether or not any fill characters are added to a line so that the terminating facsimile machine has time to print each line.

The negotiations between two facsimile machines takes place in what is known as "phase B" of the facsimile session. During this phase, messages referred to as T.30 HDLC messages are sent between facsimile machines in accordance with the T.30 procedures for Document Facsimile Transmission in the General Switched Telephone Network specification, which is promulgated by the International Telecommunication Union (ITU). Some of these messages passed during the negotiation phase may be classified into two groups: a first group which may be referred to as "transmission mode offer messages," and a second group which may be referred to as "transmission mode acceptance messages." As used herein, a transmission mode offer message is an offer from one facsimile machine to another to operate in one or one of a set of transmitting and receiving modes. Because this message merely offers to operate in one, or one of a set of transmitting modes, it is up to the offer-receiving facsimile machine to accept a transmission mode by responding with a transmission mode acceptance message.

Transmission mode acceptance messages are messages that make a decision, or give tentative or final approval for a particular transmitting mode. These acceptance messages are sent from an acceptance-transmitting facsimile machine to an acceptance-receiving facsimile machine. It may be said that in a successful negotiation, transmission mode offer messages are always followed by a transmission mode acceptance message. And, at different points in the negotiation, the acceptance-transmitting and acceptance-receiving facsimile machines may be either the originating or terminating facsimile machine. That is, at some point in the negotiation the originating facsimile machine may be the acceptance-transmitting facsimile machine, and at another point, the originating facsimile machine may be the acceptance-receiving facsimile machine, with the complimentary relationship being true for the terminating facsimile machine as well.

An example of a transmission mode offer message is a Digital Identification Signal (DIS) message, which is a message from a terminating facsimile machine that discloses the terminating machine's capabilities in the form of an offer to receive a facsimile transmission that is transmitted in one of a set of offered transmission modes. Note that this offer message does not necessarily select or decide, either tentatively or finally, upon a transmitting or receiving mode. Thus, the transmission mode offer message may, f or example, disclose that the terminating facsimile machine is capable of operating in modes defined by specifications V.17, V.29, V.33, and V.27ter, which are specifications promulgated by ITU.

An example of a transmission mode acceptance message sent in response to an offer message is a Digital Command Signal (DCS) message. This message normally accepts one of the transmission modes that was offered in the DIS message. This acceptance may be considered a tentative or conditional acceptance that may later be finally accepted following a successful transmission of a training sequence.

Because the negotiation is a back-and-forth process between two facsimile machines, other transmission mode offer and acceptance messages may follow the DCS message. For example, a Training Check (TCF) message may be considered an offer to test a communication link by transmitting a known training sequence at a rate, or in a mode, that was conditionally accepted by the DCS message. This offer to test the link by sending, for example, a series of zeros transmitted at the conditionally accepted rate may be subsequently accepted by a Confirmation to Receive (CFR) message, which is a transmission mode acceptance message that tells the originating facsimile machine that the training sequence has been successfully received and that the communication link between the two machines will probably support the accepted mode of facsimile data transmission.

As described above, the originating and terminating facsimile machines may progress through two or more rounds of offer and acceptance messages to finally arrive at the agreed upon transmitting and receiving modes for the facsimile session.

When an originating and terminating facsimile machine need to transmit facsimile data via a medium having a variable data transmission time, the negotiation of transmitting and receiving modes becomes important to the success of sending a facsimile image. An example of a medium having a variable data transmission time is a wireless medium, which may, for example, be used to provide wireless local loop telephone service to businesses and homes. The reason this wireless communications system may be considered a medium having a variable data transmission time is that the wirelessly transmitted data may be influenced by noise or interference from other users, and thus may need to be retransmitted to correct errors. This retransmission takes time and may introduce delay in the overall communications link between the originating and terminating facsimile machines. The internet or other similar network is another example of a communication medium having a variable data transmission time. Such mediums do not have a low, fixed time of data propagation. Other examples include a medium that allows random quantities of data with variable periods of idle or null characters to be synchronously transmitted.

In a wireless local loop system, telephones, facsimile machines, and other terminal equipment at the customer's site may be connected to a device frequently referred to as a fixed wireless terminal (FWT). The fixed wireless terminal provides basic telephone local loop service through a wireless or radio link. In many service areas, telephone service may be provided wirelessly at a fraction of the cost of traditional wireline infrastructure. Other benefits of wireless local loop systems are rapid deployment time, the ability to cover a large area, high capacity, and lower operating and maintenance costs.

Many wireless local loop systems are implemented with a digital air interface between the fixed wireless terminal and a base station transceiver. This means that signals from a facsimile machine connected to the fixed wireless terminal must be converted from an analog signal to a digital signal before transmission over the air. Similarly, digital signals received from the base transceiver must be converted to analog signals in the FWT before they are sent to a connected facsimile machine.

The digital air interface of the wireless system typically provides for retransmitting the data if an error is detected while receiving data. Thus, the digital air interface uses a flow-controlled protocol which may delay a stream of data while erroneously received data is being retransmitted. In contrast to this FWT wireless interface, the facsimile machine may not use flow control during the transmission of facsimile image data. This may cause a problem when the data transmission rate of the originating facsimile machine is close to the data transmission rate of the air interface. If the air interface efficiency drops due to retransmissions because of noise or other interference, the originating facsimile machine may complete the transmission of facsimile image data long before the fixed wireless terminal has transmitted the same facsimile image data over the air and to the terminating facsimile machine.

To further complicate the problem, the originating facsimile machine expects a timely reply from the terminating facsimile machine after a page of facsimile data is transmitted, wherein such a reply confirms the reception of the facsimile image data. For example, if a Message Confirmation (MCF) is not received by the originating facsimile machine within a predetermined period of time, the originating facsimile machine will disconnect the call, and further pages will not be transmitted, nor will the facsimile session end with a proper confirmation. The resulting failure to send a multipage facsimile image is a major problem with current methods of transmitting facsimile data via a communication link having a media with a variable time of data transmission.

In the prior art, it has been suggested that a fixed wireless terminal connected to a terminating facsimile machine change a transmission mode offer message from the terminating machine so that it appears to the originating facsimile machine that the terminating facisimile machine can only receive data in a mode having a slower rate than its actual maximum rate. By changing the transmission mode offer message, the fixed wireless terminal connected to the terminating facsimile machine influences the negotiation process so that the originating facsimile machine transmits at a slower rate than the maximum rate of, perhaps, both the originating and terminating facsimile machines. The purpose of this influence over the negotiation is to reduce the data rate of the entire communications link that supports the facsimile session in hope that the rate is slow enough for the air interface, and that errors in the air interface are less likely in a slower facsimile session. It is important that higher-rate facsimile machines do not independently negotiate a facsimile session having data speed that exceeds the effective throughput of the wireless communications link.

While the discussion above relates to a wireless communication link in a wireless local loop communications system, other communications media having a variable data transmission time may have similar problems supporting a facsimile data transmission session. Such other communications media may also retransmit erroneously received data packets, thus causing data transmission time over the media to be variable and to lag behind the capabilities of the facsimile machines.

While slowing down the communications link for the facsimile session may prevent the facsimile machines from negotiating a data rate higher than the link will support, the facsimile session over this slower link is less efficient than it could be. Therefore, there is a need for an improved method and system for negotiating transmitting and receiving modes for transmitting facsimile data via a medium having a variable data transmission time, wherein the improved method and system increases the efficiency of facsimile data transmission while maintaining the ability to correct errors that may occur in the data transmission medium, and while strictly adhering to the timing requirements of control messages transferred in a facsimile session.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF THE INVENTION

Figure 1:
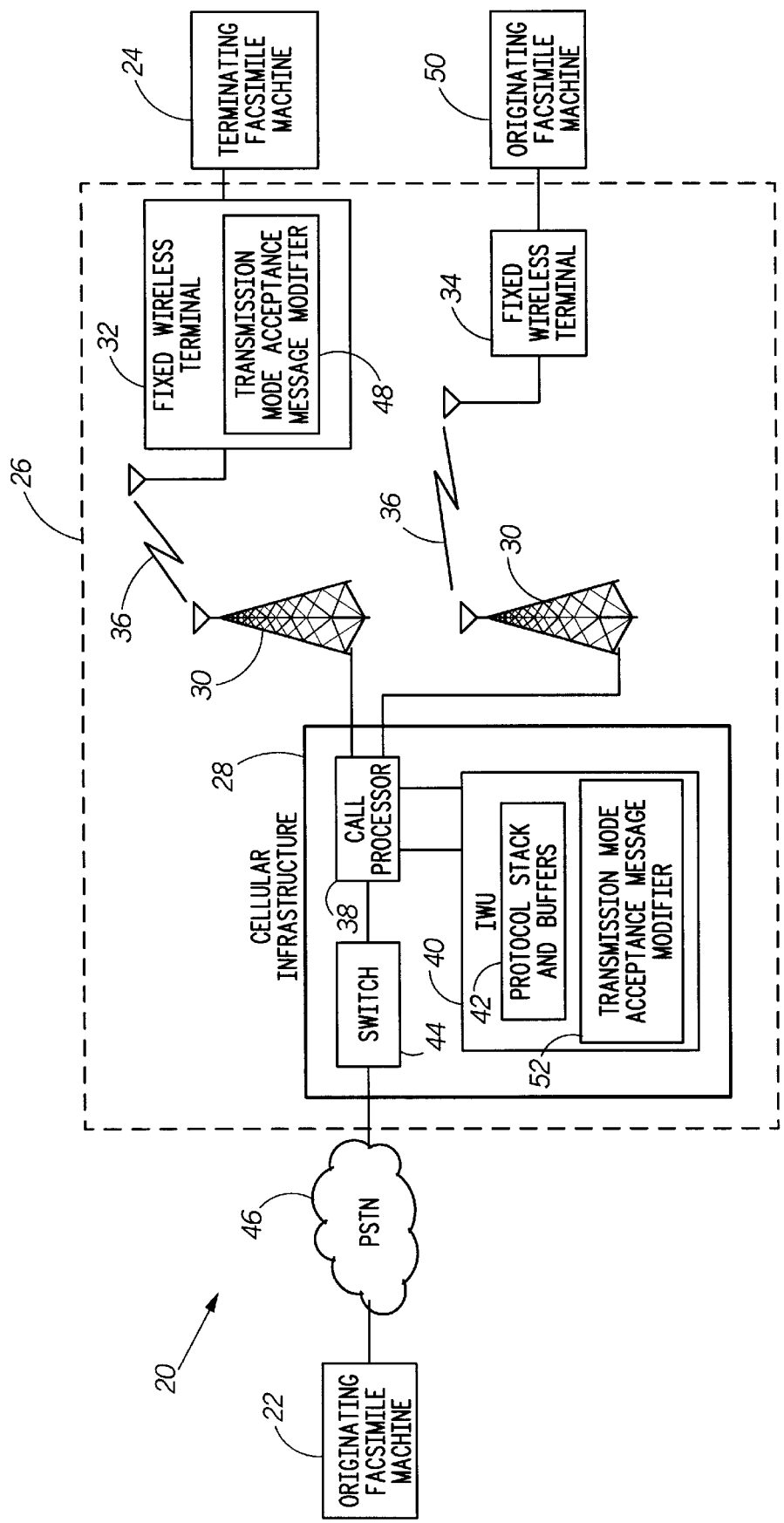
FIG. 1 depicts originating and terminating facsimile machines coupled through a communications link having a plurality of communication media, including a medium having a variable data transmission time, in accordance with the method and system of the present invention.

With reference now to FIG. 1, there is depicted a telecommunications system 20, wherein originating facsimile machine 22 is coupled to terminating facsimile machine 24 via a communications link having a plurality of communications media, including a medium having a variable data transmission time. In the example shown in FIG. 1, the medium having a variable data transmission time is a wireless medium that may delay data transmission by retransmitting a data packet that was received erroneously. In FIG. 1, the wireless medium is more particularly implemented with wireless local loop system 26.

Wireless local loop system 26 may include cellular infrastructure 28 coupled to base station transceivers 30. Base station transceivers 30 are typically located throughout a communications system service area so that they may communicate with fixed wireless terminals 32 and 34, also located throughout the service area, via air interface 36. In a preferred embodiment, air interface 36 is a code division multiple access (CDMA) air interface implemented in accordance with IS-95, which is a standard promulgated by Electronic Industries Association/ Telecommunications Industry Association (EIA/TIA). While an IS-95 CDMA air interface is shown in the example of FIG. 1, other air interfaces or communication media having a variable data transmission time may be used. Examples of other communication media having a variable data transmission time include Groupe Speciale Mobile (GSM) and other similar digital air interfaces, and the internet which uses Transmission Control Protocol/Internet Protocol (TCP/IP).

Within cellular infrastructure 28, call processor 38 handles many of the functions needed to implement a cellular communications system. For example, call processor 38 may include an interworking transcoder voice function, a mobility management function, an error detection and correction function, and other such functions detailed in the communication media specification.

Also within cellular infrastructure 28 is interworking unit (IWU) 40, which is coupled to call processor 38. Interworking unit 40 is a device for bridging or interfacing one communication format with another. It is typically responsible for converting data conforming to one data communications standard to data conforming to another. With particular relevance to the present invention, interworking unit 40 is a device within cellular infrastructure 28 that processes facsimile image data and facsimile messages in accordance with specification IS-707-A promulgated by ITU. Thus, when call processor 38 receives data that it is not designed to process (e.g., data other than voice data) call processor 38 routes such data to interworking unit 40 so that it is properly processed. Although shown separately in the example of FIG. 1, interworking unit 40 may be more closely integraded with call processor 38. It is shown separately here to emphasize the functions of the present invention.

Within interworking unit 40, appropriate protocol stacks and buffers 42 are created, maintained, and operated in order to properly transfer facsimile messages and image data in accordance with specification IS-707-A.

Switch 44 within the cellular infrastructure 28 is used to selectively couple elements with call processor 38 to the public switched telephone network (PSTN) 46. Switch 44 may also be used to connect elements in call processor 38 to the proper interworking unit 40.

As part of the overall communications link, fixed wireless terminal 32 provides local loop telephone service to terminating facsimile machine 24. The communications media in this part of the link is preferably twisted pair telephone wire. In another part of the link cellular infrastructure 28, base station transceiver 30, and air interface 36 work together to wirelessly couple fixed wireless terminal 32 to the public telephone network 46.

The part of the communications link between fixed wireless terminal 32 and the output of switch 44 may be referred to as a variable data transmission time media. The part of the communications link between the output of switch 44 and originating facsimile machine 22 may be considered a constant data transmission time media. According to an important aspect of the present invention, fixed wireless terminal 32 includes transmission mode acceptance message modifier 48, which plays an important function in the negotiation of transmitting and receiving modes for terminating facsimile machine 24 and originating facsimile machine 22, as described in greater detail below.

Although fixed wireless terminals 32 and 34 are not shown the same way in FIG. 1, they may be implemented with the same fixed wireless terminal, or if fixed wireless terminal 34 is connected to an originating facsimile machine 50 as shown, fixed wireless terminal 34 need not contain transmission mode acceptance modifier 48.

Also note that if originating facsimile machine 22 was changed to a terminating facsimile machine, transmission mode acceptance modifier 52 in IWU 40 may be used to according to the present invention to negotiate modes between originating facsimile machine 50 and facsimile machine 22.

Figure 2:
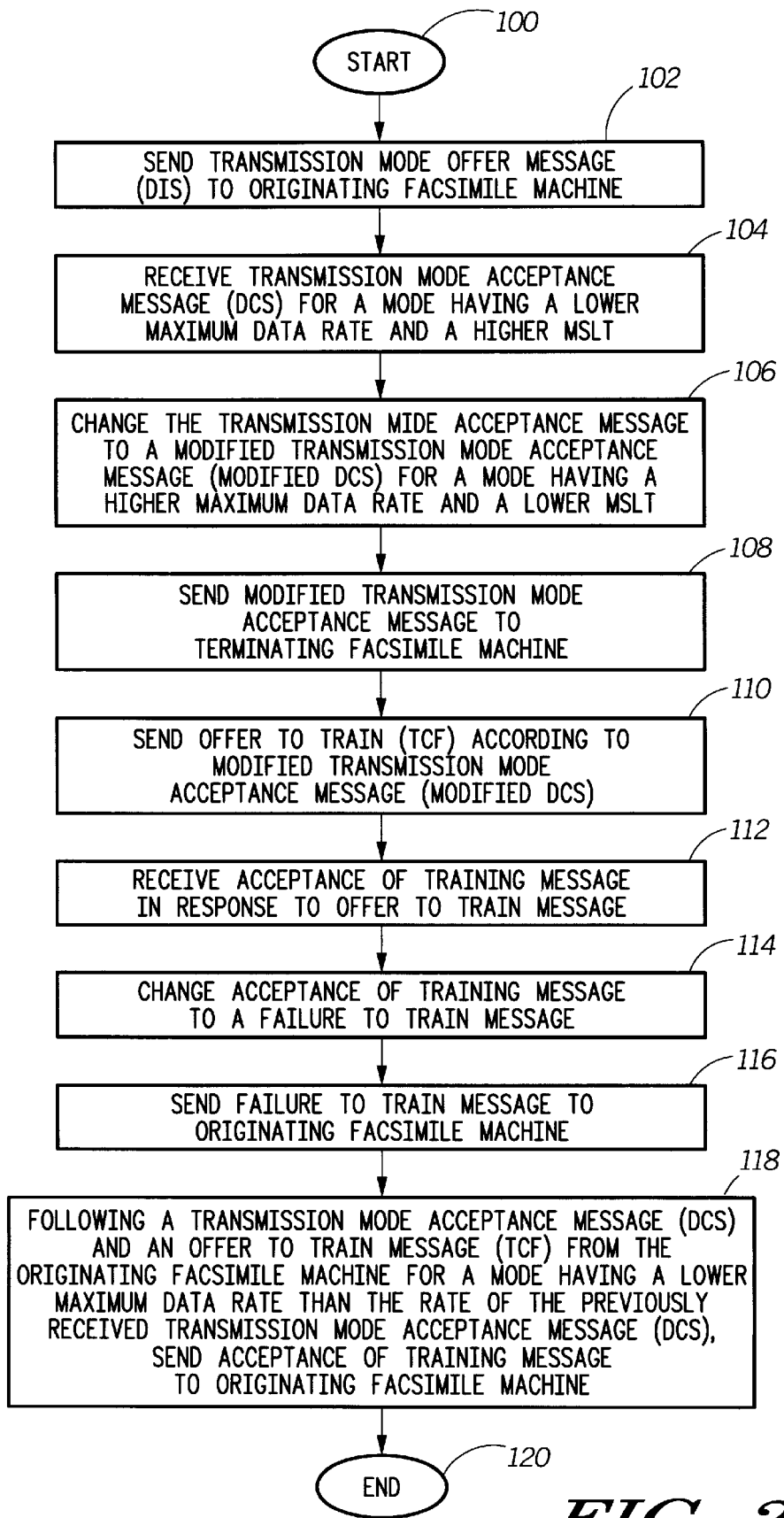
FIG. 2 is a high-level logical flowchart that illustrates the operation of the method and system of the present invention.

With reference now to FIG. 2, there is depicted a logical flowchart of the process of negotiating transmitting and receiving modes for transmitting facsimile data via a medium having a variable data transmission time according to the method and system of the present invention. Note that the process shown in the flowchart of FIG. 2 takes place within a device or devices located in a communication link between an originating facsimile machine and a terminating facsimile machine. This device may be, for example, a fixed wireless terminal in a wireless local loop system, or an interworking unit in the cellular infrastructure of a wireless local loop system. The process shown may also be executed in devices in communications links over a network, such as a local area network or the internet.

According to the present invention, the communications link between the originating facsimile machine and the terminating facsimile machine includes more than one media, wherein one of the media has a constant data transmission time and another media has a variable data transmission time. Also note that at least one constant data transmission time media must follow any other media having a variable data transmission time, wherein follow means serially located after in the communications link as data flows from the originating machine to the terminating machine. These different media are coupled together by interworking devices to form the overall communication link between the originating facsimile machine and the terminating facsimile machine. The steps illustrated in the flowchart depict operations performed in such devices to influence the negotiation of transmitting and receiving modes to improve facsimile performance when using such a mixed media communications link. In a preferred embodiment, the negotiation is influenced so that the originating and terminating facsimile machines use different transmitting and receiving modes in different communication media in the communications link.

In the example in FIG. 2 the process is performed in a fixed wireless terminal that is coupled to a constant data transmission time media on the terminating facsimile side and a variable data transmission time media on the originating facsimile side. As shown, the process begins at block 100, and thereafter passes to block 102 wherein the device sends a transmission mode offer message to the originating facsimile machine. Note that this step, as well many of the following steps in FIG. 2, may be more clearly understood with reference to FIG. 3, which illustrates the flow of messages and the modification of messages in accordance with the method and system of the present invention. Thus, in response to receiving a transmission mode offer message in the fixed wireless terminal, as illustrated at reference numeral 202 in FIG. 3, the process sends a transmission mode offer message to the originating facsimile machine, as illustrated in block 102 in FIG. 2, and as shown at reference numeral 204 in FIG. 3.

Note that according to specification IS-707-A, the fixed wireless terminal may modify the offer message by lowering the data rate from 14,400 to 9600 bits per second (bps) and raising the minimum scan line time from 0 msec to 40 msec. While this change is permitted by the specification, it merely serves to slow down the overall communications link, and does not negotiate a rate mismatch according the present invention. Also, this change modifies a transmission mode offer message rather than a transmission mode acceptance message in accordance with the present invention.

Figure 3:
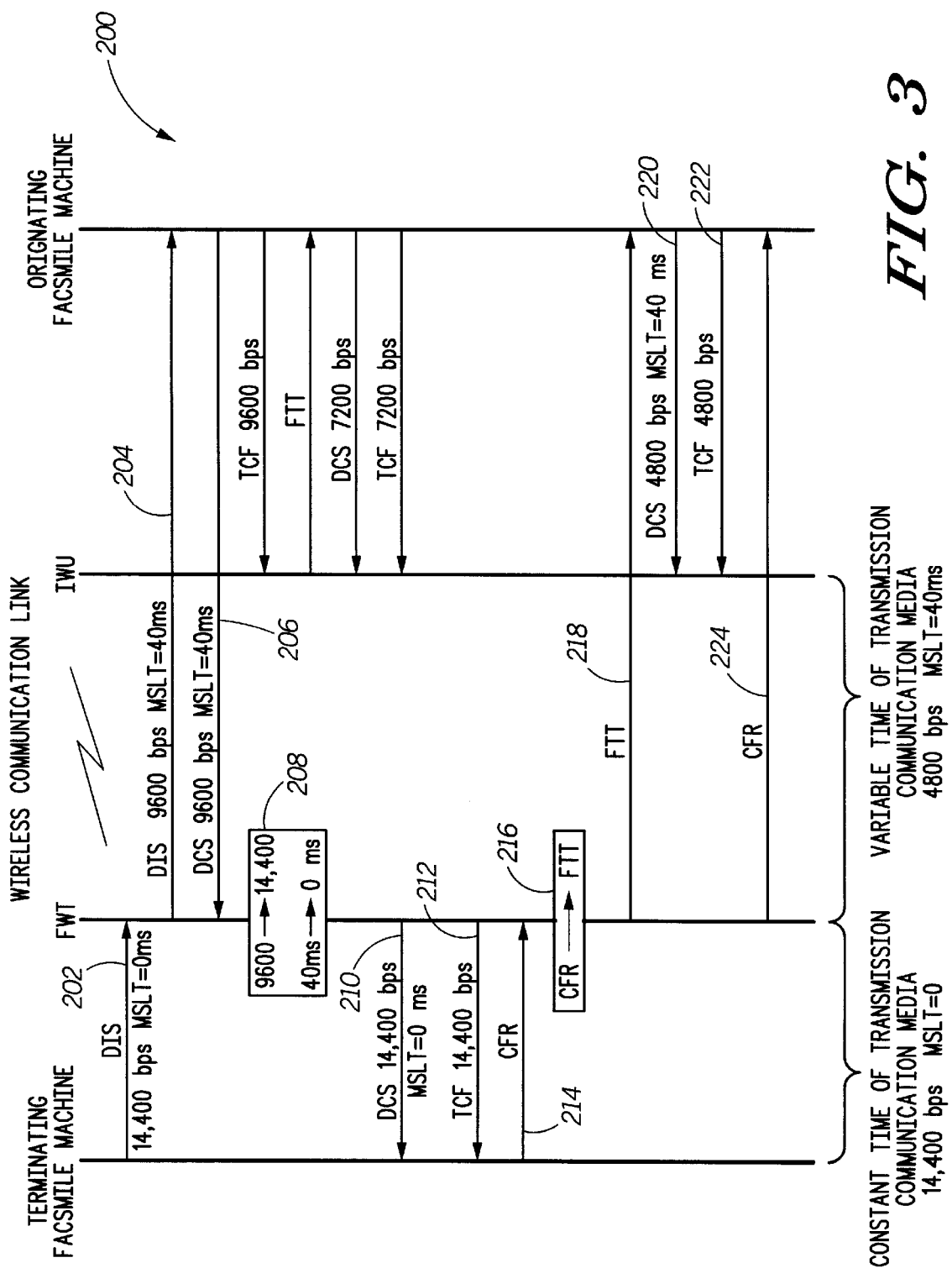
FIGS. 3, 4, and 5 illustrate the flow of messages and the modification of messages in accordance with the method and system of the present invention.

Next, the device receives and intercepts a transmission mode acceptance message for a mode having a lower maximum data rate and a higher minimum scan line time (MSLT), relative to the offer message shown at reference numeral 202, in FIG. 3 as illustrated at block 104. This transmission mode acceptance message is preferably implemented with a DCS message, the reception of which is also depicted in FIG. 3 at reference numeral 206.

Next, the process in the device changes the transmission mode acceptance message to a modified transmission mode acceptance message for a mode having a higher maximum data rate and a lower MSLT, as depicted at block 106. The higher maximum data rate is higher than the lower maximum data rate in the DCS received from the originating facsimile machine. This process of changing the transmission mode acceptance message is also illustrated in FIG. 3 at reference numeral 208, wherein the data rate is changed from 9600 bps to 14,400 bps and the minimum scan line time (MSLT) is changed from 40 milliseconds (msec) to 0 msec.

After changing the transmission mode acceptance message, the process sends the modified transmission mode acceptance message to the terminating facsimile machine, as illustrated at block 108. This step is also shown at FIG. 3 at reference numeral 210. The purpose of this step is to cause the terminating facsimile machine to believe that the originating facsimile machine is sending data at 14,400 bps rather than 9600 bps, and is also sending no fill characters as indicated by an MSLT for 0 msec of fill characters rather than an MSLT for 40 msec.

The process then sends an offer to train message according to, or in compliance with, the modified transmission mode acceptance message, as depicted at block 110. This step is also illustrated in FIG. 3 at reference numeral 212. Note that the data rate of the DCS at reference numeral 210 and the TCF at reference numeral 212 are the same. Thus, the sending of the TCF message is an offer to confirm that the communications link is suitable for the tentatively accepted mode that was accepted by the DCS message at reference numeral 210. The TCF message at reference numeral 212 requires a subsequent acceptance message that confirms that the link will probably be able to support the selected mode.

After sending the offer to train, the process receives and intercepts an acceptance of training message from the terminating facsimile machine in response to the offer to train message, as illustrated at block 112. This step is also illustrated in FIG. 3 at reference numeral 214, wherein the terminating facsimile machine sends the FWT a CFR message.

Next, the process changes the acceptance of training message to a failure to train (FTT) message, as depicted at 114. This step is further illustrated in FIG. 3 at reference numeral 216. In this step, the CFR is the acceptance of training message, or the transmission mode acceptance message, which is then modified to form a modified transmission mode acceptance message in the form of an FTT message.

Thereafter, the process sends the modified transmission mode acceptance message, which, in this example, is the failure to train message, to the originating facsimile machine, as illustrated at block 116. This step is similarly illustrated in FIG. 3 at reference numeral 218.

In response to sending the originating facsimile machine the modified transmission mode acceptance message, the originating facsimile machine sends a transmission mode acceptance message (DCS) for a mode having a lower maximum data rate than the data rate of the previously received transmission mode acceptance message. This is illustrated in FIG. 3 at reference numeral 220, which shows a DCS message having a lower maximum data rate of 4800 bps, which is lower than the data rate of 9600 bps in the previous DCS message shown at reference numeral 206.

Following the DCS message at reference numeral. 220, and the subsequent offer to train message (TCF) at reference numeral 220, the process sends an acceptance of training message (CFR) to the originating facsimile machine, as illustrated at block 118. This step is also illustrated at reference numeral 224 in FIG. 3, wherein the CFR is sent from the fixed wireless terminal to the originating facsimile machine, thereby accepting the lower rate.

According to an important aspect of the present invention, a constant-data-transmission-time portion of the communication link between the terminating facsimile machine and the device (which in FIG. 3 is the fixed wireless terminal) operates at 14,400 bps with a minimum scan line time of 0 msec, while a variable-data-transmission-time portion of the communication link between the device and the originating facsimile machine operates at 4800 bps and has a minimum scan line time of 40 msec. This rate mismatch between the constant and variable communication media is the result of modifying transmission mode acceptance messages in the fixed wireless terminal during the negotiation of transmitting and receiving modes. The negotiation according to the present invention results in the maximum data rate in the constant transmission time communication media exceeding a maximum data rate in the variable transmission time communication media, which is used to mitigate the effects of the variable time of transmission in the data medium having a variable transmission time. This mitigation is accomplished by permitting the constant transmission time communication media to operate at a higher, fixed speed which is capable of compensating for, or recovering from, any delays introduced in the variable transmission time communication media, thereby permitting the terminating facsimile machine to satisfy message timing requirements of the originating facsimile machine.

Figure 4:
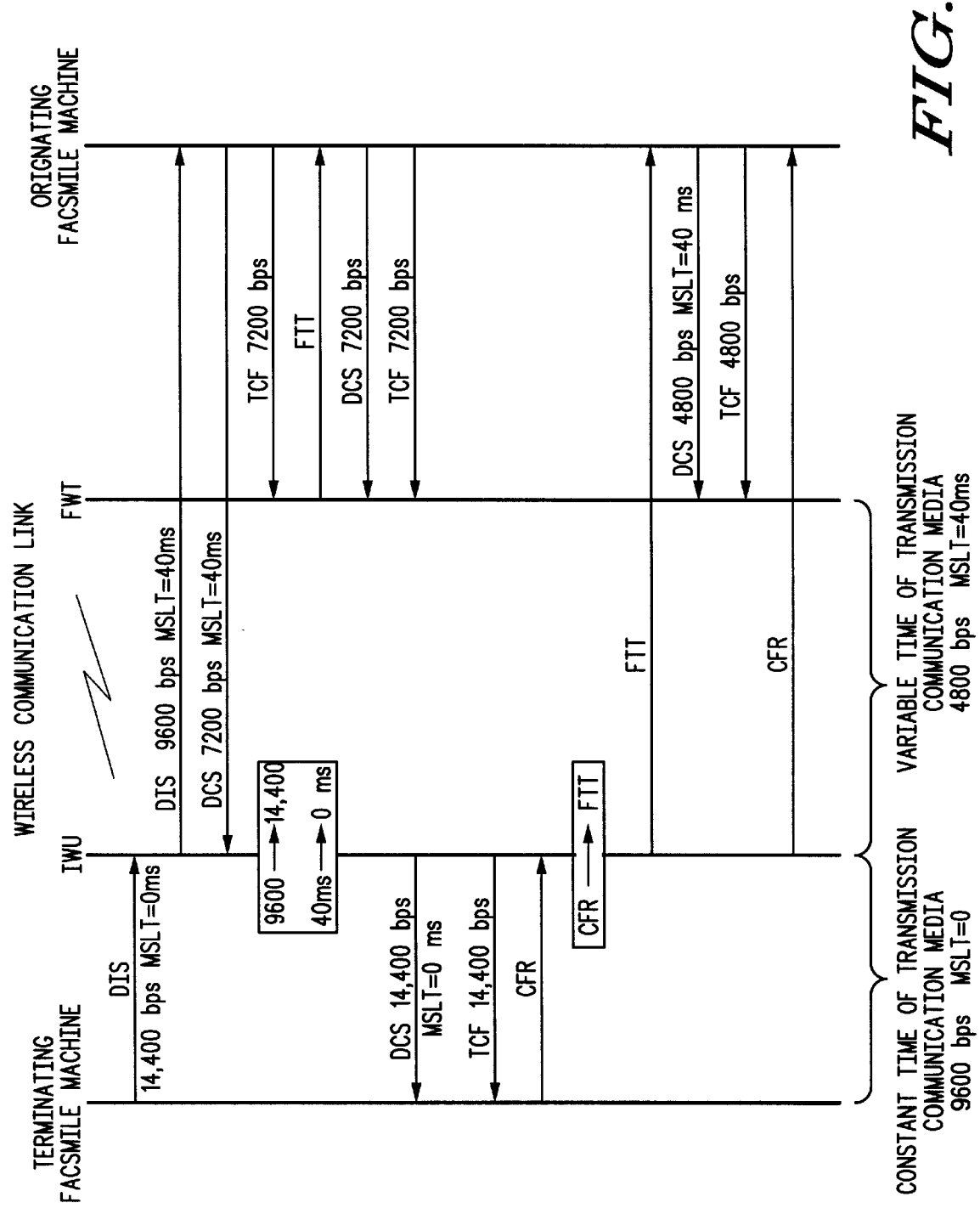

With reference now to FIG. 4, there is depicted an alternate embodiment of the present invention wherein the originating facsimile machine is coupled to a fixed wireless terminal rather than the interworking unit. Note that the interworking unit may modify transmission mode acceptance messages in a manner similar to that shown in FIG. 3, wherein changes are made in a fixed wireless terminal.

Figure 5:
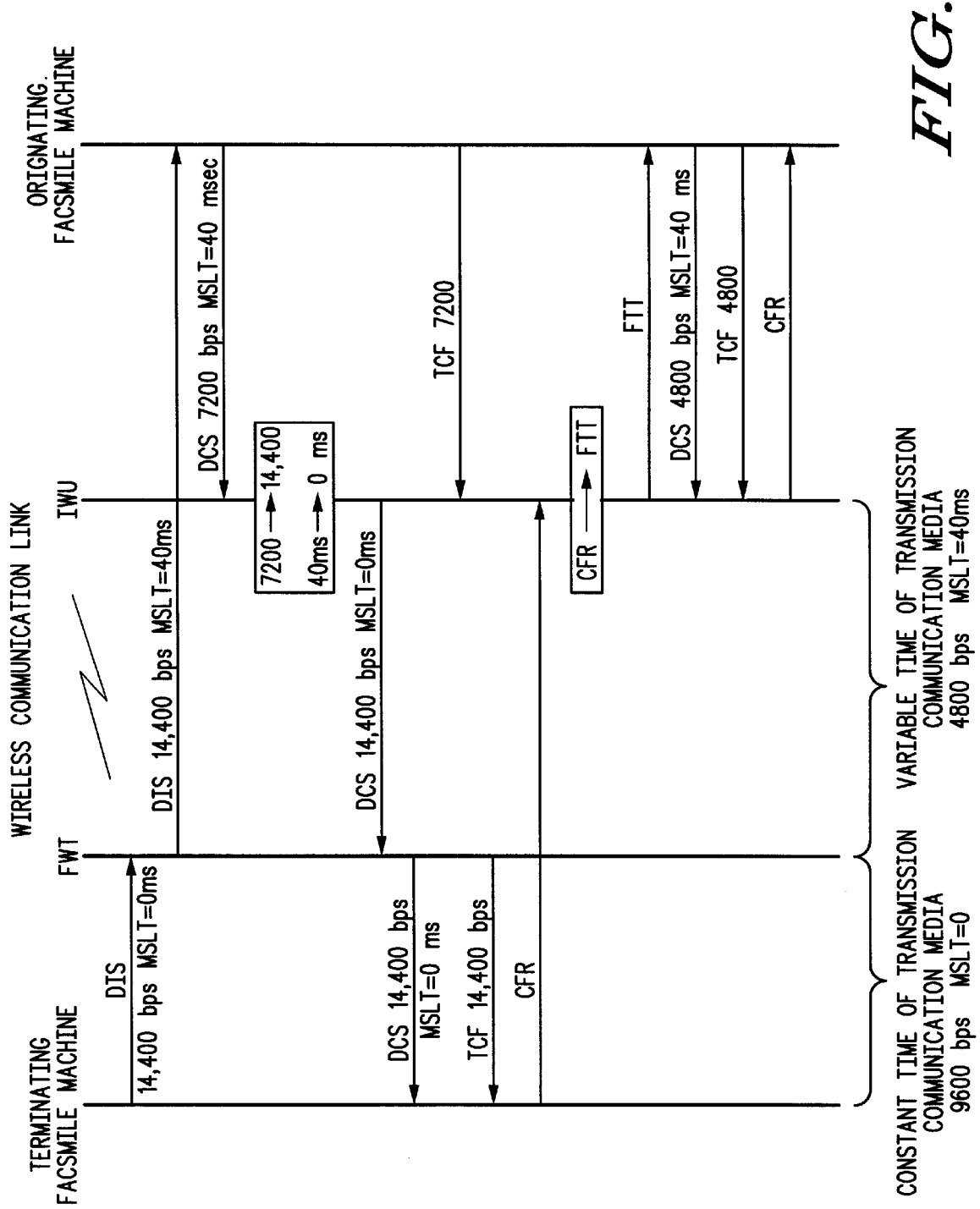

FIG. 5 shows message flows and modification of yet another embodiment of the present invention wherein the originating facsimile machine is connected to an interworking unit as shown in FIG. 3. However, the transmission mode acceptance messages are modified in the interworking unit rather than the fixed wireless terminal. It should be apparent to those persons skilled in the art that the modification of transmission mode acceptance messages may occur at various points in the communication link between the originating and terminating facsimile machines.

Note that after the negotiation illustrated in FIGS. 3, 4, and 5 the terminating facsimile machine may receive data at more than twice the transmission speed in the originating facsimile machine. This means that data received in the device may be transmitted over the constant transmission time communication media in half the time it took to transfer it over the variable transmission time communication media, thereby recovering time that may have been lost in the variable transmission time communication media. This recovered time allows the terminating facsimile machine to make a timely response to the originating facsimile machine, which contributes to the success of sending a multipage facsimile image. The negotiated rate mismatch also keeps the originating transmitting for a longer time rather than impatiently waiting for a reply after a speedy transmission of a page image.

While FIGS. 3, 4, and 5 show a modification of the transmission mode acceptance messages in two instances (e.g., at reference numerals 208 and 216 in FIG. 3), some implementations of the present invention may only modify the transmission mode acceptance message in one instance. By modifying the transmission mode acceptance message in two instances, the difference in the rates between the constant transmission time communication media and the variable transmission time communication media may be increased, which may be required under certain conditions.

In yet another embodiment of the invention, both originating and terminating facsimile machines may both be coupled to fixed wireless terminals, as in the case where originating facsimile machine 50 is sending data to terminating facsimile machine 24 in FIG. 1. In this case, a transmission mode acceptance message should be modified at only one device in order to negotiate the rate mismatch between communication media according to the present invention. Thus, in FIG. 1, the transmission mode acceptance message modifier need not be modified in both interworking unit 40 and fixed wireless terminal 32; only one transmission mode acceptance modifier is necessary.

Figure 6:
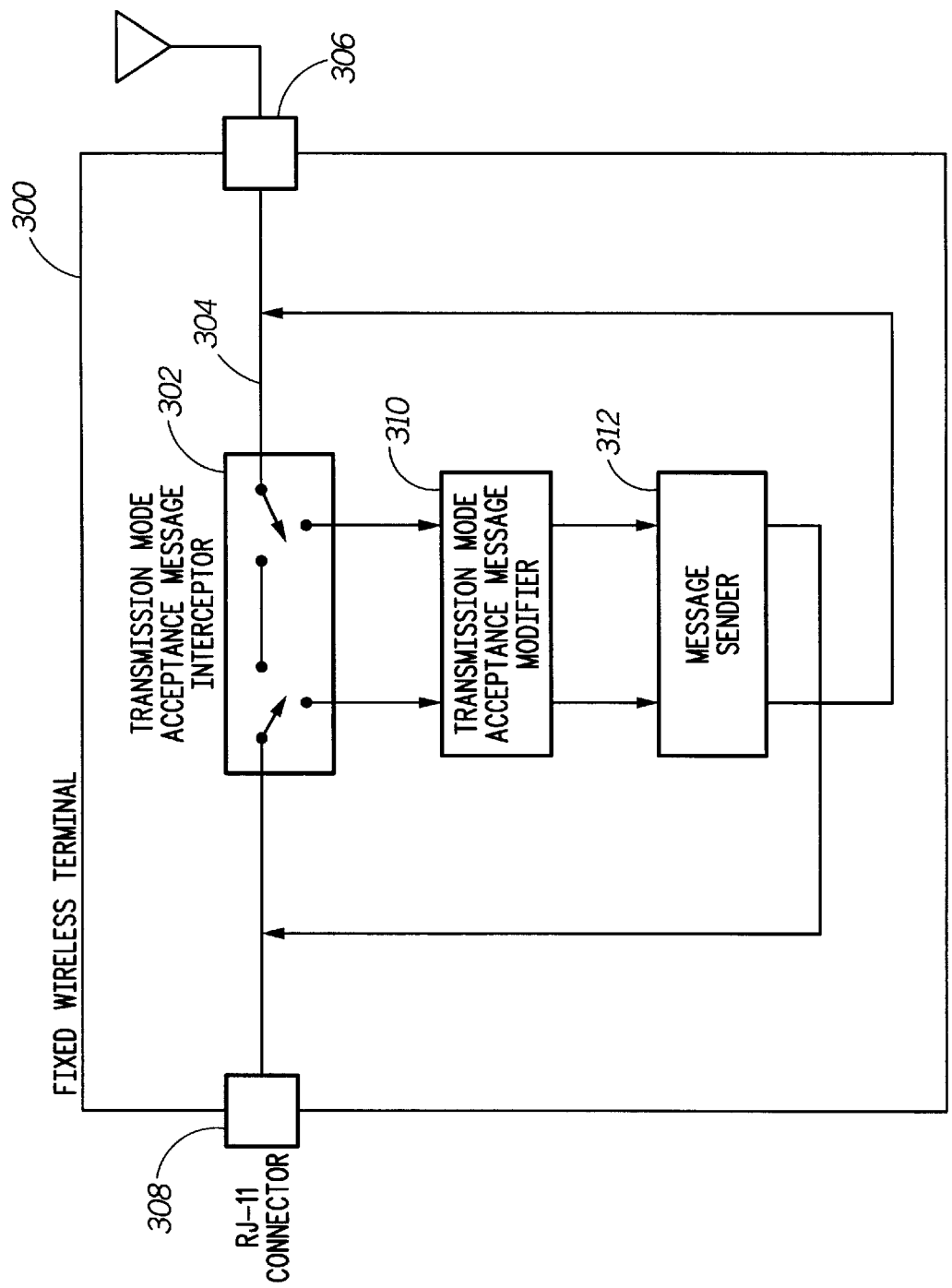
FIG. 6 depicts a fixed wireless terminal in accordance with the method and system of the present invention.

With reference now to FIG. 6, there is depicted a fixed wireless terminal 300 in accordance with the method and system of the present invention. As illustrated, fixed wireless terminal 300 includes transmission mode acceptance message interceptor 302, which is serially coupled within transmission channel 304 between antenna connector 306 and telephone line connector 308. Telephone line connector 308 is used to couple a facsimile machine to fixed wireless terminal 300.

Transmission mode acceptance message interceptor 302 is capable of intercepting transmission mode acceptance messages from two directions. That is, an acceptance message can be intercepted from both an originating facsimile machine and a terminating facsimile machine.

As these transmission mode acceptance messages are intercepted, they are sent to transmission mode acceptance message modifier 310. Transmission mode acceptance message modifier 310 is shown with two inputs which represent different paths for transmission mode acceptance messages flowing in different directions. Transmission mode acceptance message modifier 310 modifies the messages according to which direction the message is traveling, and according to the particular point in the negotiation and an amount of rate mismatch needed.

Message sender 312 is coupled to transmission mode acceptance message modifier 310 for receiving a modified transmission mode acceptance message and sending such a modified message to either the originating or terminating facsimile machine, depending upon the direction of flow for the intercepted message.

Transmission mode acceptance message interceptor 302, transmission mode acceptance message modifier 310, and message sender 312 may be implemented with software running in a controller, and with the appropriate demodulator and modulators that can receive and modulate signals according to specification T.30.

The foregoing description of a preferred embodiment of the invention has been presented for the purpose of illustration and description. It is not intended to be exhaustive or to limit the invention to the precise form disclosed. Modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for negotiating transmitting and receiving modes for transmitting facsimile data via a communications link having a plurality of communication media, the communication media including a medium having a variable data transmission time and a medium having a constant data transmission time, wherein the medium having a constant data transmission time serially follows the medium having a variable data transmission time, the method comprising the steps of:

intercepting a transmission mode acceptance message from an acceptance-transmitting one of the terminating facsimile machine and an originating facsimile machine;

modifying the transmission mode acceptance message to form a modified transmission mode acceptance message for increasing a maximum receive data rate in the terminating facsimile machine relative to a transmit data rate in the originating facsimile machine; and sending the modified transmission mode acceptance message to an acceptance-receiving one of the terminating facsimile machine and the originating facsimile machine, wherein the modified transmission mode acceptance message is part of a sequence of messages for negotiating transmitting and receiving modes in the originating and terminating facsimile machines, respectively, which sequence permits a maximum data rate in one of the media having a constant data transmission time to exceed a maximum data rate in the medium having a variable data transmission time, thereby mitigating the effects of the variable time of transmission.

2. The method for negotiating transmitting and receiving modes for transmitting facsimile data according to claim 1 wherein the intercepting step further includes intercepting, within a fixed wireless terminal, a transmission mode acceptance message from an acceptance-transmitting one of the terminating facsimile machine and an originating facsimile machine.

3. The method for negotiating transmitting and receiving modes for transmitting facsimile data according to claim 1 wherein the intercepting step further includes intercepting, within an interworking unit, a transmission mode acceptance message from an acceptance-transmitting one of the terminating facsimile machine and an originating facsimile machine.

4. The method for negotiating transmitting and receiving modes for transmitting facsimile data according to claim 1 wherein the step of intercepting a transmission mode acceptance message further includes intercepting a digital command signal (DCS) message from the originating facsimile machine, and wherein the step of modifying the transmission mode acceptance message further includes changing a lower rate transmission mode acceptance message to a higher rate transmission mode acceptance message.

5. The method for negotiating transmitting and receiving modes for transmitting facsimile data according to claim 1 wherein the step of intercepting a transmission mode acceptance message further includes intercepting a digital command signal (DCS) message from the originating facsimile machine, and wherein the step of modifying the transmission mode acceptance message further includes changing a higher minimum scan line time (MSLT) acceptance message to a lower minimum scan line time (MSLT) acceptance message.

6. The method for negotiating transmitting and receiving modes for transmitting facsimile data according to claim 1 wherein the step of intercepting a transmission mode acceptance message further includes intercepting a confirmation to receive (CFR) message from the terminating facsimile machine, and wherein the step of modifying the transmission mode acceptance message further includes the step of changing an acceptance of training message to a failure to train message, and further including the step of:

sending the acceptance of training message to the originating facsimile machine following a lower transmission rate offer message from the originating facsimile machine, wherein the lower transmission rate offer message represents an offer to transmit facsimile data at a rate lower than that offered in a previous offer message.

7. The method for negotiating transmitting and receiving modes for transmitting facsimile data according to claim 6 wherein the lower transmission rate offer message from the originating facsimile machine is a digital command signal (DCS) message.

8. The method for negotiating transmitting and receiving modes for transmitting facsimile data according to claim 1 wherein the medium having a variable data transmission time includes a wireless communication link having a variable time of transmission.

9. A system for negotiating transmitting and receiving modes for transmitting facsimile data via a communications link having a plurality of communication media, the communication media including a medium having a variable data transmission time and a medium having a constant data transmission time, wherein the medium having a constant data transmission time serially follows the medium having a variable data transmission time, the system comprising:

means for intercepting a transmission mode acceptance message from an acceptance-transmitting one of the terminating facsimile machine and an originating facsimile machine;

means for modifying the transmission mode acceptance message to form a modified transmission mode acceptance message for increasing a maximum receive data rate in the terminating facsimile machine relative to a transmit data rate in the originating facsimile machine; and means for sending the modified transmission mode acceptance message to an acceptance-receiving one of the terminating facsimile machine and the originating facsimile machine, wherein the modified transmission mode acceptance message is part of a sequence of messages for negotiating transmitting and receiving modes in the originating and terminating facsimile machines, respectively, which sequence permits a maximum data rate in one of the media having a constant data transmission time to exceed a maximum data rate in the medium having a variable data transmission time, thereby mitigating the effects of the variable time of transmission.

10. The system for negotiating transmitting and receiving modes for transmitting facsimile data according to claim 9 wherein the means for intercepting further includes means for intercepting, within a fixed wireless terminal, a transmission mode acceptance message from an acceptance-transmitting one of the terminating facsimile machine and an originating facsimile machine.

11. The system for negotiating transmitting and receiving modes for transmitting facsimile data according to claim 9 wherein the means for intercepting further includes means for intercepting, within an interworking unit, a transmission mode acceptance message from an acceptance-transmitting one of the terminating facsimile machine and an originating facsimile machine.

12. The system for negotiating transmitting and receiving modes for transmitting facsimile data according to claim 9 wherein the means for intercepting a transmission mode acceptance message further includes means for intercepting a digital command signal (DCS) message from the originating facsimile machine, and wherein the means for modifying the transmission mode acceptance message further includes means for changing a lower rate transmission mode acceptance message to a higher rate transmission mode acceptance message.

13. The system for negotiating transmitting and receiving modes for transmitting facsimile data according to claim 9 wherein the means for intercepting a transmission mode acceptance message further includes means for intercepting a digital command signal (DCS) message from the originating facsimile machine, and wherein the means for modifying the transmission mode acceptance message further includes means for changing a higher minimum scan line time (MSLT) acceptance message to a lower minimum scan line time (MSLT) acceptance message.

14. The system for negotiating transmitting and receiving modes for transmitting facsimile data according to claim 9 wherein the means for intercepting a transmission mode acceptance message further includes means for intercepting a confirmation to receive (CFR) message from the terminating facsimile machine, and wherein the means for modifying the transmission mode acceptance message further includes means for changing an acceptance of training message to a failure to train message, and further including:

means for sending the acceptance of training message to the originating facsimile machine following a lower transmission rate offer message from the originating facsimile machine, wherein the lower transmission rate offer message represents an offer to transmit facsimile data at a rate lower than that offered in a previous offer message.

15. The system for negotiating transmitting and receiving modes for transmitting facsimile data according to claim 14 wherein the lower transmission rate offer message from the originating facsimile machine is a digital command signal (DCS) message.

16. The system for negotiating transmitting and receiving modes for transmitting facsimile data according to claim 9 wherein the medium having a variable data transmission time includes a wireless communication link having a variable time of transmission.

17. A fixed wireless terminal comprising:

a transmission mode acceptance message interceptor for intercepting transmission mode acceptance messages from an acceptance-transmitting one of an originating facsimile machine and a terminating facsimile machine;

a transmission mode acceptance message modifier for changing a transmission mode acceptance message having a lower maximum data transmission rate to a modified transmission mode acceptance message having a higher maximum data transmission rate in response to intercepting a transmission mode acceptance message in the transmission mode acceptance message interceptor; and a message sender coupled to the transmission mode acceptance message modifier for sending the modified transmission mode acceptance message to a an acceptance-receiving one of the originating facsimile machine and the terminating facsimile machine.

* * * * *